US011325334B2

(12) United States Patent
Ishida

(10) Patent No.: US 11,325,334 B2
(45) Date of Patent: May 10, 2022

(54) LOAD DETECTION DEVICE AND CONTROL METHOD OF LOAD DETECTION DEVICE

(71) Applicant: TOYOTA PRODUCTION ENGINEERING, Munakata (JP)

(72) Inventor: Yuki Ishida, Fukuoka (JP)

(73) Assignee: TOYOTA PRODUCTION ENGINEERING, Munakata (JP)

( * ) Notice: Subject to any disclaimer, the term of this patent is extended or adjusted under 35 U.S.C. 154(b) by 407 days.

(21) Appl. No.: 16/682,350

(22) Filed: Nov. 13, 2019

(65) Prior Publication Data

US 2020/0171774 A1 Jun. 4, 2020

(30) Foreign Application Priority Data

Nov. 29, 2018 (JP) .............................. JP2018-223865

(51) Int. Cl.
| | |
|---|---|
| *B30B 15/14* | (2006.01) |
| *B30B 15/28* | (2006.01) |
| *B29C 43/58* | (2006.01) |
| *B30B 15/02* | (2006.01) |
| *B21D 24/02* | (2006.01) |

(52) U.S. Cl.
CPC .............. *B30B 15/14* (2013.01); *B21D 24/02* (2013.01); *B29C 43/58* (2013.01); *B30B 15/026* (2013.01); *B30B 15/28* (2013.01)

(58) Field of Classification Search
CPC ... B30B 15/0094; B30B 15/16; B30B 15/161; B30B 15/166; B30B 15/22; B30B 15/281; B29C 43/58; B29C 2043/5808; H02H 3/027
See application file for complete search history.

(56) References Cited

U.S. PATENT DOCUMENTS

| | | | | |
|---|---|---|---|---|
| 4,195,563 | A * | 4/1980 | Budraitis | ............ B30B 15/0094 100/50 |
| 5,379,688 | A * | 1/1995 | Ishii | ........................ B30B 15/14 100/50 |
| 8,566,618 | B2 * | 10/2013 | Floyd | ...................... G06F 1/324 713/320 |
| 10,486,384 | B2 * | 11/2019 | Kurokawa | .............. B30B 15/28 |
| 2019/0248091 | A1 * | 8/2019 | Kurokawa | .............. B30B 13/00 |

FOREIGN PATENT DOCUMENTS

JP 2016-137497 A 8/2016

* cited by examiner

*Primary Examiner* — Matthew Katcoff
(74) *Attorney, Agent, or Firm* — Oliff PLC

(57) ABSTRACT

A load detection device includes a detector, a wireless transmitter, a power source, and a controller. The load detection device is provided in dies that includes a first die and a second die. The load detection device is installed on at least one of the first die and the second die and configured to detect whether the first die and the second die are in a closed state. The controller is configured to execute an electricity cutoff process of stopping electricity supply from the power source to the detector and the wireless transmitter when the closed state of the first die and the second die has continued for a predetermined time.

6 Claims, 6 Drawing Sheets

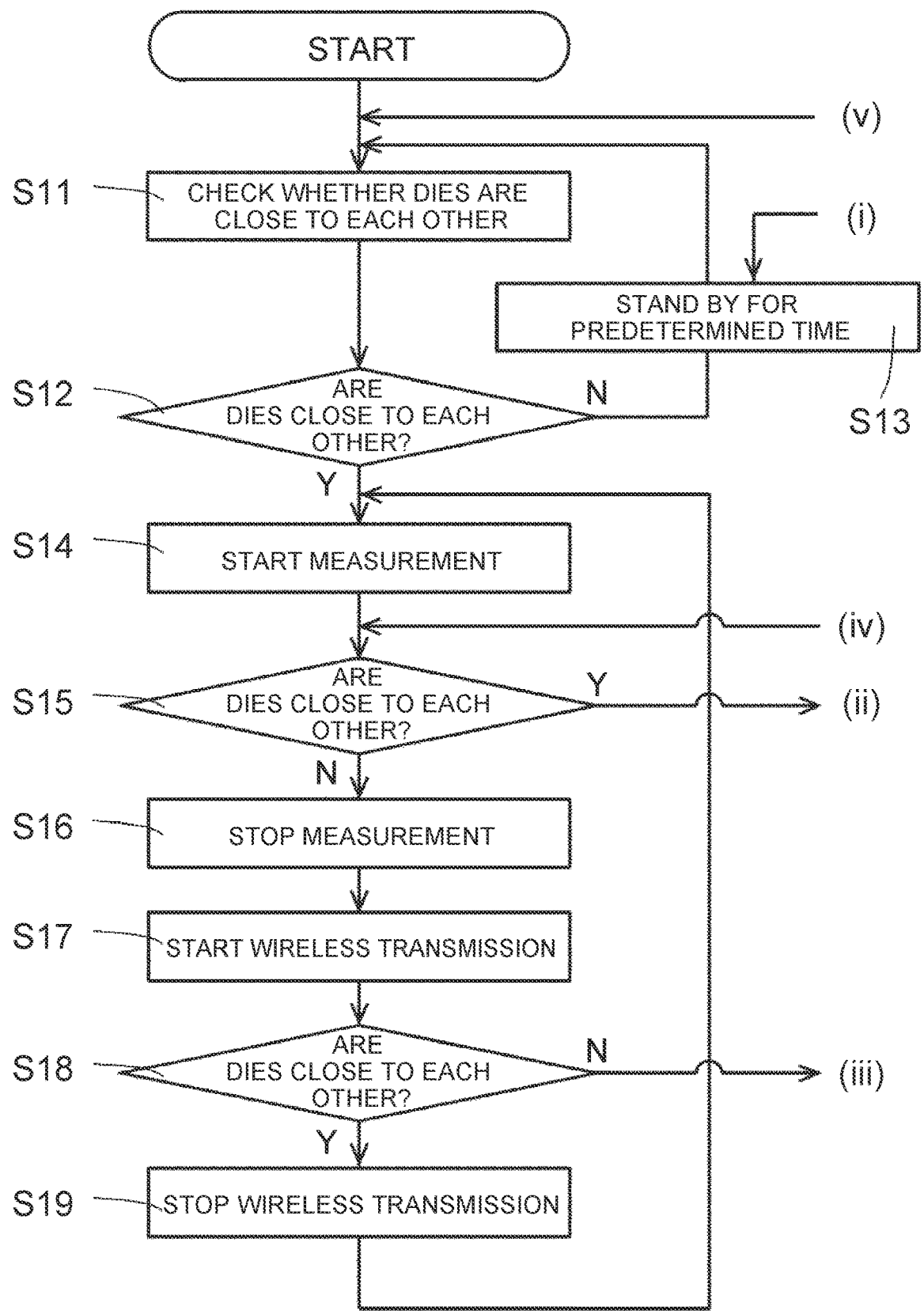

LOAD DETECTION DEVICE AND CONTROL METHOD OF LOAD DETECTION DEVICE

INCORPORATION BY REFERENCE

The disclosure of Japanese Patent Application No. 2018-223865 filed on Nov. 29, 2018 including the specification, drawings and abstract is incorporated herein by reference in its entirety.

BACKGROUND

1. Technical Field

The present disclosure relates to a load detection device installed on dies and a control method of the load detection device.

2. Description of Related Art

In a press-molding machine, a workpiece is pressed and molded under pressure between one die (upper die) and another die (lower die). For processing accuracy, a workpiece undergoing press-working is processed under a pre-specified pressing load between the dies. If processed under a load much higher than the pre-specified load, the molded workpiece will have cracks, whereas if processed under a load much lower than the pre-specified load, the molded workpiece will have wrinkles and not be shaped as desired. To secure stable quality of processed workpieces, therefore, it is necessary to keep track of the pressing load between the dies.

In this connection, Japanese Patent Application Publication No. 2016-137497 (JP 2016-137497 A) proposes a device and method for constantly detecting a load between dies during pressing. In JP 2016-137497 A, a sensor is installed for each pair of dies to detect whether the dies are close to each other. When detection of positions and loads by sensors assumes that the sensors are connected to measurement instruments by wire, the number of pieces of wire increases as the number of sensors increases. Each time the dies are changed according to the manufacturing plan, the wiring connection needs to be also changed, which makes work complicated.

As a solution, the possibility of wirelessly transmitting signals from a detection device, such as a sensor, to a control computer etc. inside a factory has been explored. To realize wireless transmission, the detection device itself is equipped with a power source unit, such as a battery, that operates the detection device, a sensor that transmits detected information, and others. In this case, operating an electric circuit of the detection device only when the molding machine is in operation is considered in order to reduce the amount of electricity consumption.

However, upper and lower dies of a press-molding machine are often stored in a closed state after being removed from the pressing machine. Since the upper and lower dies are thus in a closed state, i.e., in contact with each other, the load detection device provided inside the dies keeps detecting that the closed state continues. In this case, the electricity consumption cannot be reduced, and a measurement current is constantly consumed while the dies are stored, resulting in a shorter battery life.

Separately providing a power switch in the detection device makes it necessary to manually turn off the power switch before storing the dies. This adds to the number of work steps. Moreover, failure to turn off the switch may occur. Another option to consider is a configuration in which power sources for measurement inside the detection devices are uniformly turned off through wireless communication. However, to be able to perform measurement operation through wireless communication, the detection devices need to stand by for a wake-up signal that is required for these devices to re-start. Thus, electricity for wireless communication is consumed all the same.

SUMMARY

In view of these circumstances, the present inventor has conducted an intensive study with a focus on the time during which dies are closed, and consequently succeeded in reducing the amount of electricity consumed by the load detection device during storage of the dies.

The present disclosure provides a load detection device that is installed inside dies to detect a pressing load between the dies, and a control method of the load detection device. This load detection device can achieve a longer operating time by consuming a smaller amount of electricity during a non-operating time when the dies are stored.

A first aspect of the present disclosure relates to a load detection device. The load detection device is provided in dies. The dies include a first die and a second die. The load detection device is installed on at least one of the first die and the second die. The load detection device is configured to detect whether the first die and the second die are in a closed state. The load detection device includes a detector, a wireless transmitter, a power source, and a controller. The controller is configured to execute an electricity cutoff process of stopping electricity supply from the power source to the detector and the wireless transmitter when the closed state of the first die and the second die has continued for a predetermined time.

A second aspect of the present disclosure relates to a control method of a load detection device provided in dies. The dies include a first die and a second die. The load detection device is installed on at least one of the first die and the second die. The load detection device includes a detector, a wireless transmitter, a power source, and a controller. The control method includes: detecting, by the detector, whether the first die and the second die are close to each other; determining, by the controller, whether the first die and the second die are in a closed state based on a detection result of the detector; and when the closed state of the first die and the second die has continued for a predetermined time, executing, by the controller, an electricity cutoff process of stopping electricity supply from the power source to the detector and the wireless transmitter.

In the load detection device and the control method of the load detection device of the present disclosure, the load detection device is installed on at least one of the first die and the second die, and the load detection device includes the detector, the controller, the wireless transmitter, and the power source. When the closed state of the first die and the second die has continued for a predetermined time, the controller executes the electricity cutoff process of stopping electricity supply from the power source to the detector and the wireless transmitter. Thus, it is possible to automatically turn off the power source of the load detection device, so as to avoid failure to do so, during a non-operating time when the dies are stored. As a result, the load detection device can achieve a longer operating time by consuming a smaller amount of electricity, thereby contributing to increasing the work efficiency.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a first flowchart relating to measurement and wireless transmission;

DETAILED DESCRIPTION OF EMBODIMENTS

In the above load detection device, the controller may be configured to cancel the electricity cutoff process upon release of the first die and the second die from the closed state after the closed state of the first die and the second die has continued for a predetermined time.

The above load detection device may further include a vibration detector.

In the above load detection device, the dies may be attached to a press-working machine.

The above load detection device may be housed inside a distance block. The distance block may be installed on at least one of the first die and the second die.

Figure 1:
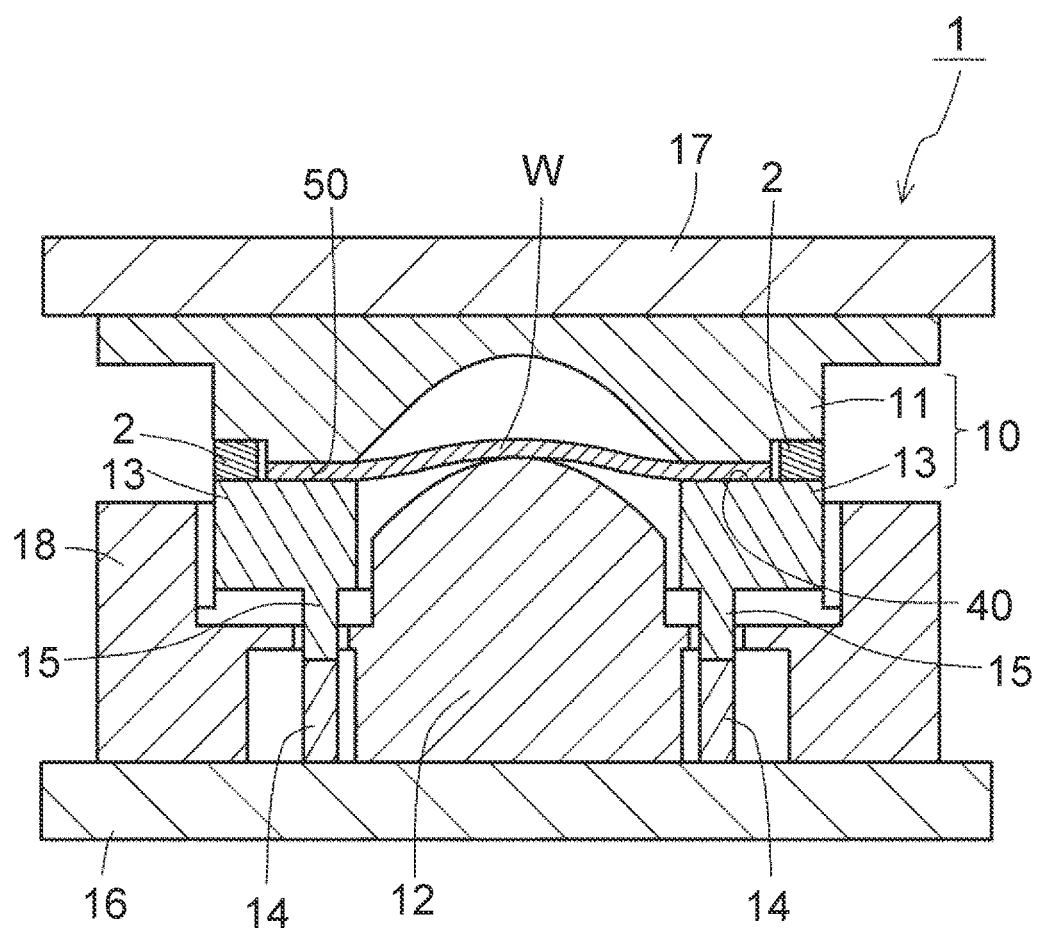
FIG. 1 is an overall sectional view of a press-working machine.

A load detection device 2 of the present disclosure will be described using the overall sectional view of a press-working machine 1 disclosed in FIG. 1. The press-working machine 1 is equipped with a first die 11 (called a die etc.) and a second die 13 (called a ring etc.). A punch 12 is sometimes included in the second die 13. The press-working machine 1 shown in FIG. 1 is a processing machine for drawing press-molding, and dies 10 include the first die 11 and the second die 13. The second die of the press-working machine 1 shown in FIG. 1 is formed by the ring 13 disposed around the drawing punch 12.

A workpiece W, such as a metal sheet, is placed on a mount part 40 located at a predetermined position in the ring 13 of the second die, and undergoes drawing press-molding under pressure of the punch 12. A peripheral portion of the workpiece W is in contact with the mount part 40 of the ring 13 of the second die. The peripheral portion of the workpiece W is fixed by being pressed between the mount part 40 of the ring 13 and a contact part 50 of the first die 11.

The punch 12 of the second die is fixed on a bolster 16. A cushion pad (not shown) is installed under the bolster 16. A die cushion mechanism (not shown) is provided under the cushion pad. As the die cushion mechanism, an air type (air die cushion), a servo type (servo die cushion), or the like is used. The ring 13 disposed around the punch 12 is disposed above the bolster 16. The ring 13 of this embodiment has an annular shape surrounding the punch 12. The ring 13 is connected to a cushion pin 14 through a leg 15, and is pushed up by the cushion pin 14. Further, the annular ring 13 is surrounded by a guide 18 disposed on an upper side of the bolster 16. A load applied to the ring 13 during drawing press-molding is adjusted as appropriate, and the ring 13 is pushed down by the first die 11.

A slide 17 (ram) is disposed on an upper side of the first die 11 (die). A slide driving unit (not shown) is installed above the slide 17. A motor, gear, cam, crank, etc. are installed inside the slide driving unit. As the motor rotates, the crank moves, which causes the slide 17 to move up and down. FIG. 1 shows only main parts of the press-working machine that are necessary for the description of the present disclosure, and of course, the press-working machine includes other mechanisms, components, etc. than those shown in FIG. 1.

In the press-working machine 1 shown in FIG. 1, the ring 13 of the second die and the die 11 of the first die are close to each other. The workpiece W is sandwiched between (a peripheral portion of) the ring 13 and (a peripheral portion of) the die 11 of the first die. A closed state of and a pressing load between the dies 10 (the ring 13 and the die 11) at that time are detected by a plurality of load detection devices 2.

The load detection devices 2 are installed in die surface regions other than regions that are used for drawing press-molding of the workpiece W. In the example shown in FIG. 1, the load detection devices 2 are disposed around the mount part 40 of the ring 13 (second die). While this is not shown, the load detection devices 2 can also be installed around the contact part 50 of the die 11 (first die). The number of the load detection devices 2 and the installation positions thereof are set as appropriate according to the size and shape of the dies 10 (the first die and the second die) and the size and shape of the workpiece W. The load detection devices 2 are installed for the purpose of detecting an abnormality, such as repeated press-molding, at an early stage and thereby minimizing damage to the equipment including the dies.

Figure 2:
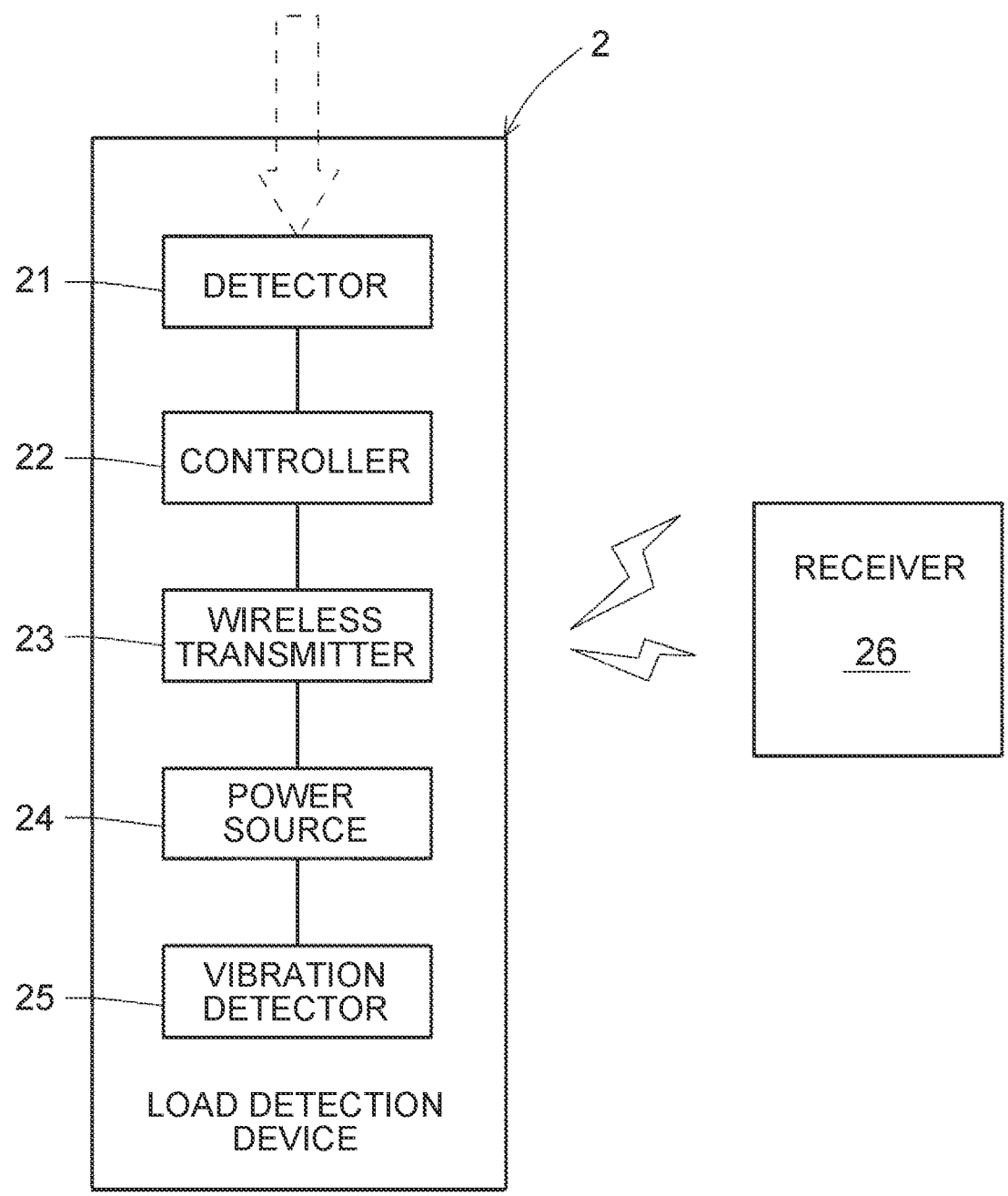
FIG. 2 is a configuration chart of a load detection device.

FIG. 2 is a configuration chart of the load detection device 2. The load detection device 2 of this embodiment detects a load and transmits a signal of the detected load by wireless transmission. The load detection device 2 includes a detector 21, a controller 22, a wireless transmitter 23, a power source 24, and a vibration detector 25. The detector 21 is a load cell, piezoelectric sensor, strain gauge, or the like, and is a commonly known sensor that converts a pressing load between the first die and the second die into an electric signal. The controller 22 is an IC or the like that controls transmission of a signal of the load detected by the detector 21, and executes and cancels an electricity cutoff process to be described later. In this embodiment, a system-on-a-chip (SoC) is used as the controller 22.

The wireless transmitter 23 is a radio wave transmitting circuit, module, or the like that wirelessly transmits a signal of a pressing load value. The range of frequencies used for transmission is set as appropriate, for example, to the 2.4 GHz band or the 950 MHz band. A device complying with wireless communication standards, such as IEEE802.11ac or Bluetooth (R), is used as the wireless transmitter 23. The power source 24 is a commonly known battery. The power source 24 may be substituted by an element that generates electricity by a load applied to the load detection device 2. The vibration detector 25 is a commonly known vibration sensor, acceleration sensor, or the like. When the vibration detector 25 detects no vibration or impact, the dies 10 are regarded not to be in operation. Thus, the vibration detector 25 is used to check whether or not the dies 10 are in a stored state, i.e., the dies 10 are in a statically placed state.

Further, a receiver 26 is provided outside the press-working machine 1 and the load detection device 2. The receiver 26 receives a pressing load value transmitted from the wireless transmitter 23 of the load detection device 2, and accumulates the pressing load value in time sequence. A device such as a general-purpose personal computer, a server, a programmable logic controller (PLC), or the like is installed as the receiver 26. In the receiver 26, pressing load values transmitted from the load detection devices 2 installed in the respective regions are collected, and it is checked whether or not each pressing load value is within a specified range of the load value.

Figure 3:
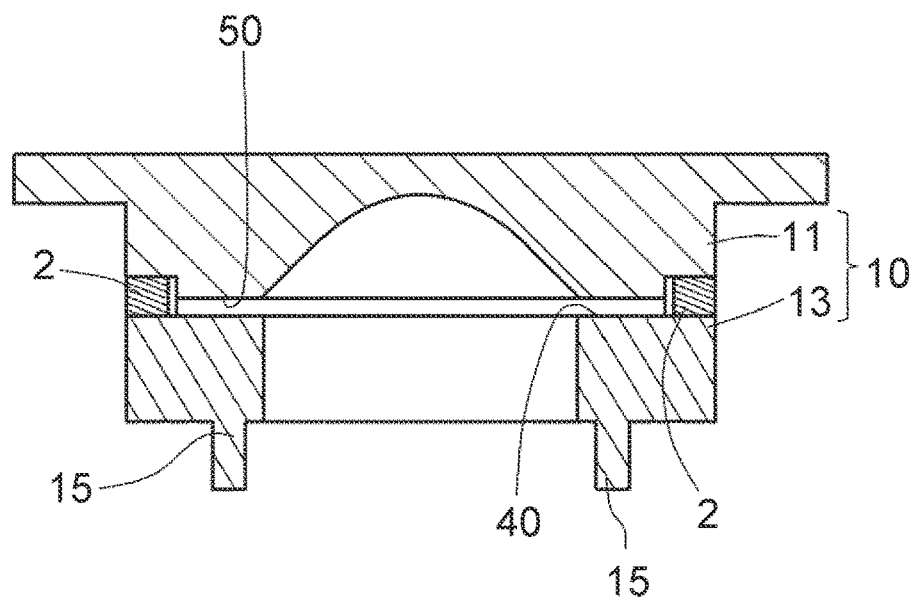
FIG. 3 is an overall sectional view of dies in a stored state.

FIG. 3 is a sectional view of the first die (die 11) and the second die (ring 13) included in the dies 10. In FIG. 3, the punch 12 is not shown. In the press-working machine 1, the dies 10 are replaced when the article to be molded changes. The dies 10 are removed from the press-working machine 1 and stored. As can be seen from FIG. 3, the first die (die 11) is in contact with the second die (ring 13) when the dies 10 are stored.

As long as the stored state of the dies 10 shown in FIG. 3 continues, the load detection device 2 that has no process to perform constantly detects the pressing load of the first die (die 11) and the second die (ring 13) also during storage. The load detection device 2 keeps detecting the load and constantly transmits a signal relating to the detected load to the outside. Thus, the load detection device 2 keeps consuming electricity, regardless of the main operation of the press-working machine 1.

Figure 4A:
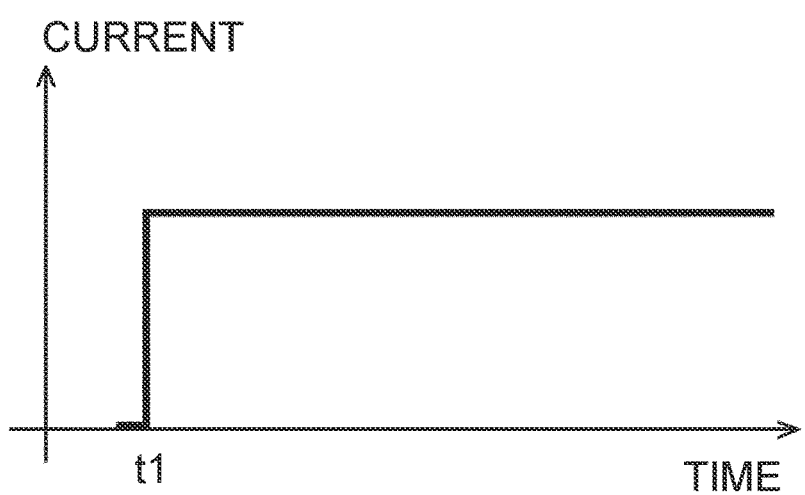
FIG. 4A is a graph showing time and a current.
Figure 4B:
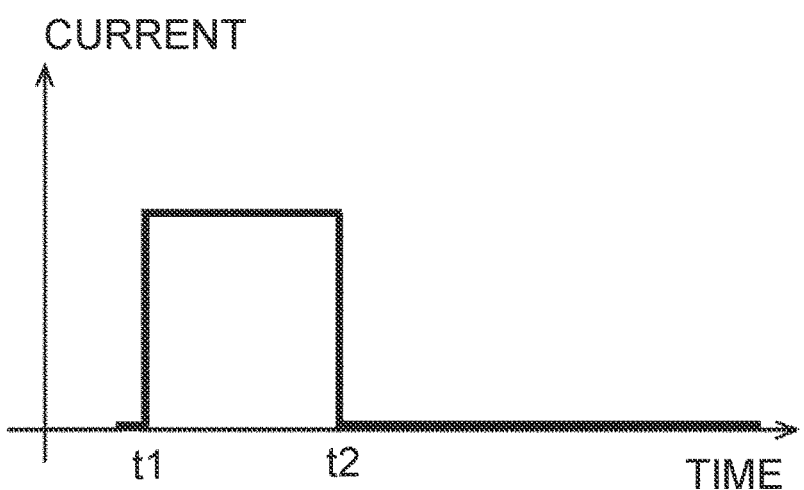
FIG. 4B is a graph showing time and a current.

This situation is represented by the graphs of FIG. 4A and FIG. 4B showing a current. In both graphs, time and a current are plotted on the abscissa and the ordinate, respectively. FIG. 4A is a graph of a current, without applying the embodiment of the present disclosure, when the dies 10 remain in a stored state and are not in the press-working machine 1 in the normal closed state. Since the load detection device 2 constantly detects the load, a current keeps flowing from the power source 24 to the parts of the load detection device 2 and the battery power in the power source 24 is consumed. The rise in the graph of FIG. 4A is caused by application of a current in normal operation of the dies 10 installed in the press-working machine 1. In other words, the first die (die 11) and the second die (ring 13) are close to each other. Time t1 in FIG. 4A is a point at which current application is started, for example, as the dies 10 have come close to each other. The same applies to FIG. 4B.

When the closed state of the first die (die 11) and the second die (ring 13) has continued for a predetermined time, the controller 22 of the load detection device 2 of this embodiment executes the electricity cutoff process of stopping electricity supply from the power source 24 inside the load detection device 2 to the detector 21 and the wireless transmitter 23 (a process of putting the load detection device 2 in a sleep state). However, electricity supply is not completely stopped during execution of the electricity cutoff process, and a minimum amount of electricity required to operate the controller 22 and maintain an internal clock, an internal memory, etc. is continuously supplied.

In this embodiment, when the closed state of the first die (die 11) and the second die (ring 13) of the dies 10 has continued for a predetermined time (e.g., 10 seconds), the electricity cutoff process is executed as shown in FIG. 4B. Time t2 in FIG. 4B is a point at which the electricity cutoff process is executed. As a result, the current to the parts of the load detection device 2 is stopped (electricity cutoff process) after a predetermined time (e.g., 10 seconds), so that consumption of the battery power in the power source 24 is reduced. As will be described later with flowcharts, the electricity cutoff process is automatically executed, which eliminates the need to worry about workers' failure to turn off the power source.

Next, the closed state of the first die (die 11) and the second die (ring 13) continues for a predetermined time (e.g., 10 seconds or longer). Thereafter, upon release of the first die (die 11) and the second die (ring 13) from the closed state, the electricity cutoff process of stopping electricity supply from the power source 24 to the detector 21 and the wireless transmitter 23 is canceled (electricity supply is resumed; the load detection device 2 is woken up). Thus, the electricity cutoff process is canceled, for example, when the dies 10 are attached to the press-working machine 1 again and press-working is started. Specifically, for example, when the dies 10 are attached to the press-working machine 1 again and press-working is started, the electricity cutoff process is canceled and the load detection device 2 returns to a state of being able to detect the load.

The flow of load measurement and wireless transmission in the load detection device 2 of this embodiment will be described below based on the flowcharts of FIG. 5, FIG. 6, and FIG. 7. The flowchart of FIG. 5 shows the flow of measurement of the load between the first die (die 11) and the second die (ring 13) by the load detection device 2, and the operation status of the dies 10. As shown in the flowchart of FIG. 5, the controller 22 checks whether the dies 10 (the first die (die 11) and the second die (ring 13)) are close to each other through a load value of the detector 21 (S11). When the dies 10 are not close to each other (No in S12), the controller 22 issues a command for the wireless transmitter 23 to stand by for a predetermined time (S13). Then, the controller 22 checks again whether the dies 10 are close to each other. By repeating this process, the controller 22 can reliably check whether the dies 10 are close to each other before moving to the next step.

A load cell, piezoelectric sensor, strain gauge, or the like is used as the detector 21. Such detectors generally consume a very large amount of current. Therefore, the detector 21 is not yet activated at the point when the dies 10 (the first die (die 11) and the second die (ring 13)) start to come close to each other. Whether the dies 10 are close to each other is detected by using a detector of another system, instead of by the regular load detection method. For example, a detection method using an action of the first die (die 11) pressing a magnetic micro switch, a physical push switch, or the like is conceivable.

The micro switch or the push switch may be provided in a main power source circuit (not shown) for the wireless transmitter 23 and the detector 21. When the wireless transmitter is in a deep sleep state (a state where a minimum level of current is applied to maintain the memory), a terminal voltage of the micro switch or the push switch is regularly monitored by the wireless transmitter, and transition to wake-up mode is effected by an interruption process. However, when the push switch is provided in the main power source circuit, a signal from the detector cannot be processed during a start-up time following pressing down of the push switch. In reality, therefore, a configuration in which only a measurement circuit is turned off by the interruption process is employed for pressing dies that operate at high speed.

When the dies 10 are close to each other (Yes in S12), the controller 22 starts to measure the load during pressing by the detector 21 (S14). When the dies 10 are not close to each other (No in S15), the controller 22 assumes that the first die (die 11) and the second die (ring 13) have separated from each other, and stops measurement by the detector 21 (S16).

Then, the controller 22 starts wireless transmission to the receiver 26 by the wireless transmitter 23 (S17). When the dies 10 are close to each other (Yes) in S15, the controller 22 monitors an accumulated standby time, to be described later, and stops measurement. Conditions for stopping measurement include that the accumulated standby time is equal to or longer than a certain time, or that the dies 10 have separated from each other. The load value detected during pressing is transmitted each time the load is detected. Wireless transmission of the value of the detected pressing load is transmitted in synchronization with the pressing cycle of each time's press-working.

When the dies 10 are close to each other (Yes in S18), the controller 22 stops wireless transmission to the receiver 26 by the wireless transmitter 23 (S19). Thereafter, the controller 22 starts measurement by the detector 21 again (S14). When the dies 10 are close to each other in S18, press-molding on the workpiece W by the dies 10 is in progress and the detection value of the detector 21 is varying. Therefore, while the detection value is varying, the controller 22 need not perform wireless transmission, and returns to S14 to continue measurement. This sequence of steps provided in the flowchart is performed to detect the pressing load during normal press-molding of the workpiece W.

Figure 6:
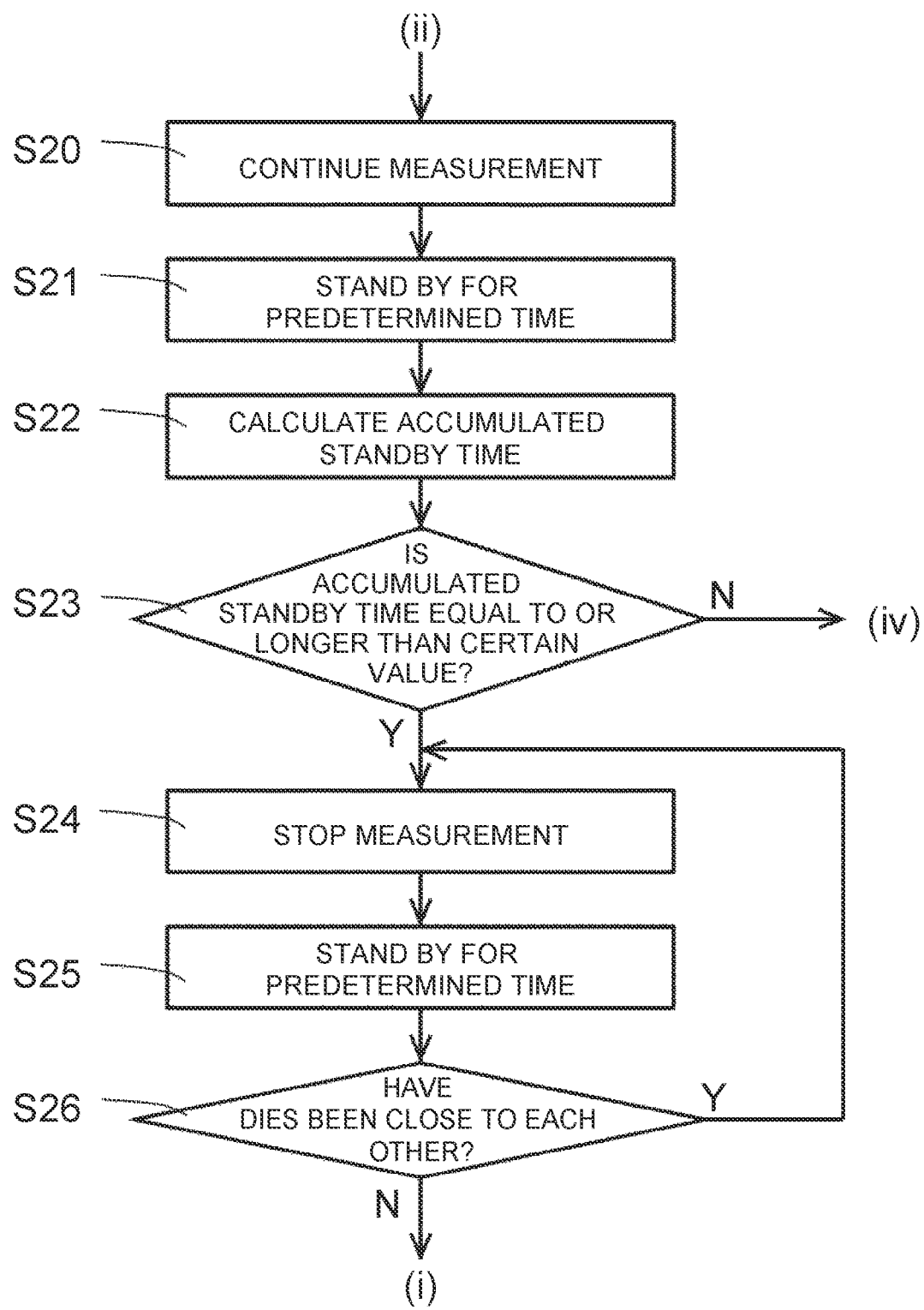
FIG. 6 is a second flowchart relating to measurement and wireless transmission.

When the dies 10 are close to each other after measurement is started in S14 (Yes in S15), as shown in the flowchart of FIG. 6, the controller 22 continues measurement by the detector 21 (S20). Then, the controller 22 stands by for a predetermined time (S21), and adds the standby time (calculates the accumulated standby time) (S22). In the calculation of the accumulated standby time in S22, all the accumulated standby times that are incurred each time the process of S20 to S23 is repeated. When the accumulated standby time is equal to or longer than a certain time (a certain value) (Yes in S23), the controller 22 stops measurement by the detector 21 (S24) and issues a command to stand by for a predetermined time (S25).

For example, when the predetermined standby time is 20 milliseconds and the accumulated standby time is 10 seconds (=20 milliseconds×500 times of accumulation), the controller 22 determines that the dies 10 are in a non-operating state, and reduces the current applied from the power source 24 to the parts of the load detection device 2 (executes the electricity cutoff process). When determining whether the dies 10 are in a non-operating state, the controller 22 determines whether to execute the electricity cutoff process with the vibration detector 25 having detected no vibration for a predetermined time also taken into account.

When the accumulated standby time is shorter than a certain time (a certain value) (No in S23), the controller 22 returns to S15 and follows the applicable branch of the flowchart according to whether or not the dies 10 are close to each other. Then, the controller 22 executes the process of S16 and the subsequent steps or the process of S20 and the subsequent steps (see the above description). When the dies 10 have been close to each other for a predetermined time (Yes in S26), the controller 22 stops measurement (S24), and issues a command to stand by for a predetermined time (S25). On the other hand, when the dies 10 have not been close to each other for a predetermined time (No in S26), the controller 22 issues a command to stand by for a predetermined time (S13).

When the dies 10 have not been close to each other for a predetermined time after measurement is stopped in S24 (No in S26), the first die (die 11) and the second die (ring 13) of the dies 10 are in a state of being separated from each other. This means that the dies 10 have been installed in the press-working machine 1 and have returned to an operating state, so that the controller 22 cancels the electricity cutoff process and resumes application of a current to resume the operation of the parts of the load detection device 2. Optionally, the controller 22 can check whether the dies 10 have returned to an operating state based also on whether the vibration detector 25 has detected vibration.

Figure 7:
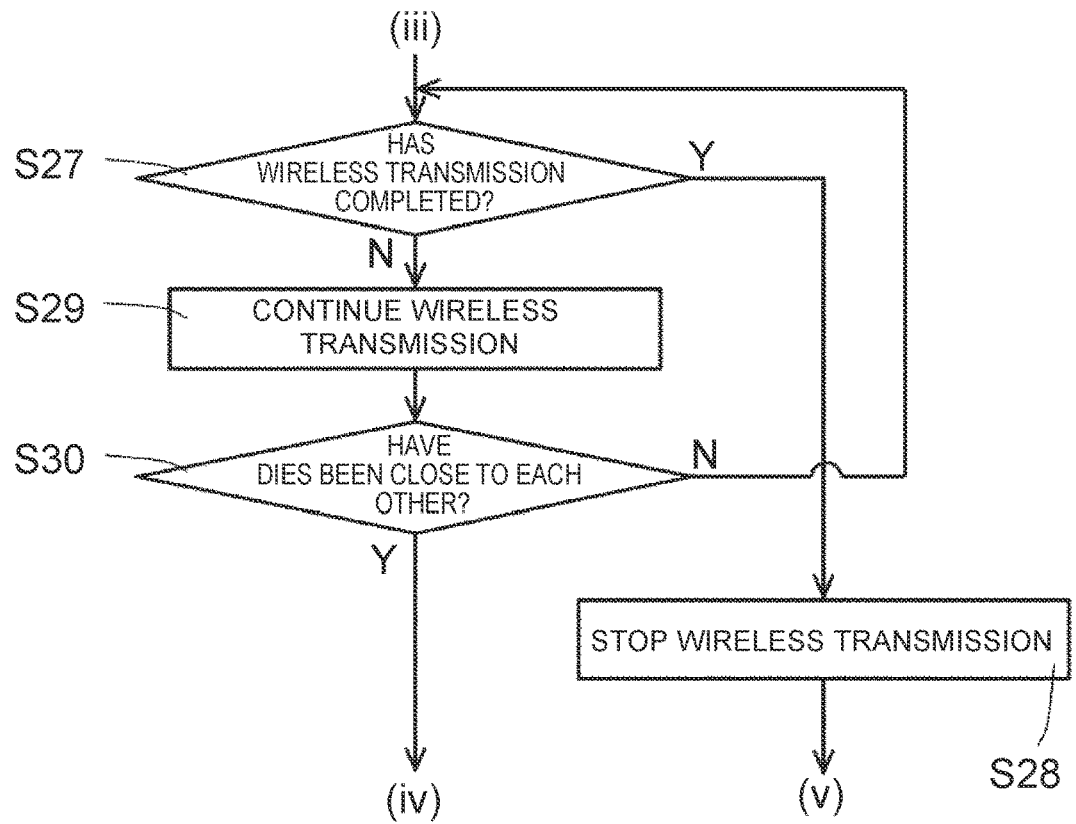
FIG. 7 is a third flowchart relating to measurement and wireless transmission.

When the dies 10 have not been close to each other for a predetermined time after wireless transmission is started in S17 (No in S18), as shown in the flowchart of FIG. 7, the controller 22 checks whether wireless transmission from the wireless transmitter 23 has completed. When wireless transmission has completed (Yes in S27), the controller 22 stops wireless transmission from the wireless transmitter 23 (S28). Thereafter, the controller 22 returns to the process of checking whether the dies 10 are close to each other (S11). On the other hand, when wireless transmission has not completed (No in S27), the controller 22 continues wireless transmission from the wireless transmitter 23 based on the assumption that there are still signals to be transmitted (S29). When the dies 10 have been close to each other for a predetermined time after wireless transmission is continued (S29) (Yes in S30), the controller 22 stops wireless transmission to the receiver 26 by the wireless transmitter 23 (S19). On the other hand, when the dies 10 have not been close to each other for a predetermined time (No in S30), the controller 22 returns to the process of checking whether wireless transmission has completed (S27). Thus, the controller 22 can detect the pressing load of the dies 10 at the current point and reliably transmit the detected load value.

Figure 8:
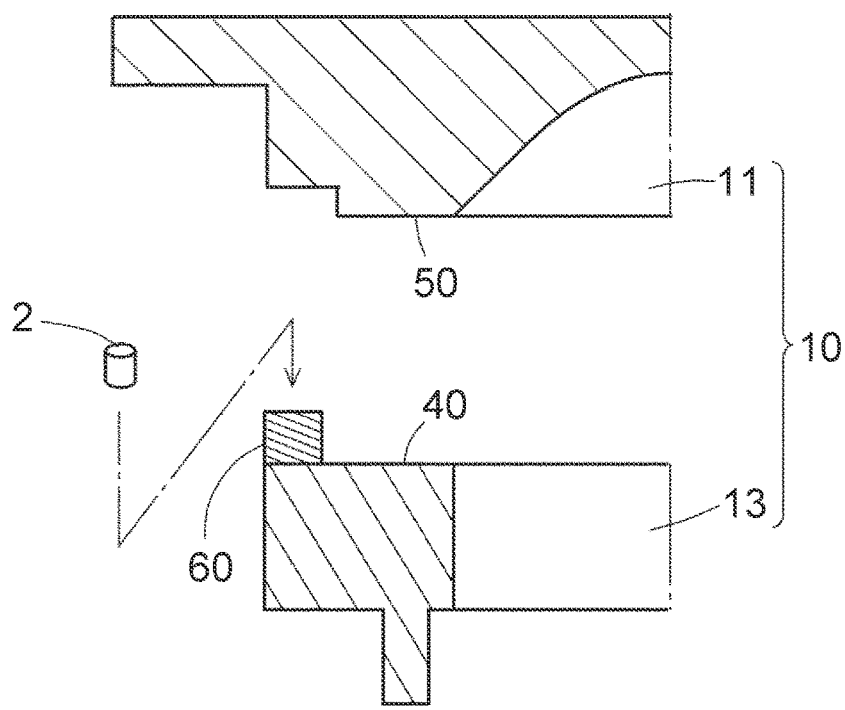
FIG. 8 is a partial sectional perspective view showing another form of the load detection device.

As can be seen from the sectional view of the dies 10 in FIG. 8, a distance block 60 is installed on the dies 10. The interval between the dies 10 (the first die (die 11) and the second die (ring 13)) during pressing is finely adjusted by the distance block 60. The load detection device 2 is housed in a housing hole (not shown) of the distance block 60. The load detection device may instead be housed in a side hole (not shown) formed in a side surface of the distance block. Alternatively, the load detection device may be in the form of being wound around the distance block. The distance block 60 housing the load detection device 2 is installed on at least one of the first die (die 11) and the second die (ring 13). In the form shown in FIG. 8, the distance block 60 is installed on the second die (ring 13).

For example, when the distance block 60 has dimensions of 65 mm in diameter and 30 mm in height, the load detection device 2 has smaller dimensions than the distance block 60. Specifically, the load detection device 2 has a diameter of 20 mm to 40 mm and a height of 10 mm to 20 mm. In the case where the load detection device 2 is in the form of being wound around the distance block 60, the distance block and the load detection device are integrated and have a diameter of 105 mm and a height of 30 mm. Thus using the distance block to install the load detection device is convenient in that the process of separately forming the hole for installing the load detection device in the die can be omitted. In particular, a decrease in strength due to excessive processing of the die can be avoided, which makes this arrangement preferable.

In another embodiment, whether or not the vibration detector 25 has detected vibration is also taken into account in determining whether to execute the electricity cutoff process (keep the load detection device 2 in a sleep state) or cancel the electricity cutoff process (wake up the load detection device 2). The applicable state is selected and confirmed according to whether vibration is constantly detected or no vibration is detected. In addition, the load detection device 2 is provided with an electricity cutoff circuit that stops electricity supply from the power source 24 to the detector 21 and the wireless transmitter 23 when a current keeps flowing during normal operation for a long time. If a current keeps flowing despite the dies not being in operation, the dies are regarded to be in a stored state as described above, so that it can be determined that electricity to the load detection device 2 should be cut off.

The load detection device 2 can be further provided with a magnetic sensor, a distance sensor, or the like (not shown) that detects whether the dies are separated from each other. Such sensors can be used to check whether the dies have returned to operation, and the electricity cutoff process is canceled based on a detection result of the sensor.

The power source 24 in the load detection device 2 can be omitted. For example, a piezoelectric element that generates electricity by a load pressure generated as the dies come close to each other (as the die moves downward) is mounted on the load detection device 2. Electricity generated by this piezoelectric element can cover the electricity required for load detection and wireless transmission during normal operation. If the dies have been close to each other for a long time during storage etc., the load does not vary and therefore the piezoelectric element does not generate electricity, so that the load detection device 2 transitions naturally to an electricity cutoff state.

By consuming a smaller amount of electricity during a non-operating time when the dies are stored, the load detection device of the present disclosure can achieve a longer operating time. Thus, this load detection device is promising as a substitute for existing load detection devices.

What is claimed is:

1. A load detection device provided in dies, the dies including a first die and a second die, the load detection device being installed on at least one of the first die and the second die and configured to detect whether the first die and the second die are in a closed state, the load detection device comprising:
   a detector;
   a wireless transmitter;
   a power source; and
   a controller configured to execute an electricity cutoff process of stopping electricity supply from the power source to the detector and the wireless transmitter when the closed state of the first die and the second die has continued for a predetermined time.

2. The load detection device according to claim 1, wherein the controller is configured to cancel the electricity cutoff process upon release of the first die and the second die from the closed state after the closed state of the first die and the second die has continued for the predetermined time.

3. The load detection device according to claim 1, further comprising a vibration detector.

4. The load detection device according to claim 1, wherein the dies are attached to a press-working machine.

5. The load detection device according to claim 1, wherein:
   the load detection device is housed inside a distance block; and
   the distance block is installed on at least one of the first die and the second die.

6. A control method of a load detection device provided in dies, the dies including a first die and a second die, the load detection device being installed on at least one of the first die and the second die and including a detector, a wireless transmitter, a power source, and a controller, the control method comprising:
   detecting, by the detector, whether the first die and the second die are close to each other;
   determining, by the controller, whether the first die and the second die are in a closed state based on a detection result of the detector; and
   when the closed state of the first die and the second die has continued for a predetermined time, executing, by the controller, an electricity cutoff process of stopping electricity supply from the power source to the detector and the wireless transmitter.

* * * * *